United States Patent

Six

[15] 3,640,362
[45] Feb. 8, 1972

[54] CLUTCH CONTROLS FOR POWER TAKEOFF SHAFTS OF TRACTOR OR LIKE VEHICLES

[72] Inventor: Richard Six, 8011 Forstern, Sackgasse 2, Germany

[22] Filed: Aug. 3, 1970

[21] Appl. No.: 60,588

[30] Foreign Application Priority Data

Aug. 6, 1969 Germany..................P 19 39 951.0

[52] U.S. Cl. .............................192/48.7, 74/471 R, 74/491
[51] Int. Cl.......................................................F16d 21/08
[58] Field of Search................192/48.7; 74/491, 471 R, 469, 74/512

[56] References Cited

UNITED STATES PATENTS

| 1,499,418 | 7/1924 | Stevens................................192/48.7 |
| 1,902,701 | 3/1933 | Hegemann..........................192/48.7 |
| 2,991,863 | 7/1961 | Glesmann et al. ...................192/48.7 |

*Primary Examiner*—Allan D. Herrmann
*Attorney*—Walter Spruegel

[57] ABSTRACT

Controls for first and second clutches between a power drive of a tractor or like vehicle and a driving section of power takeoff shaft and between the driving and driven sections of the power takeoff shaft, comprising a lever-actuated crankshaft with first and second crank pins, and operating connections between the first crank pin and first clutch and between the second crank pin and second clutch, with the crank pins being so angularly displaced that the first clutch is actuated prior to and after each actuation of the second clutch.

7 Claims, 7 Drawing Figures

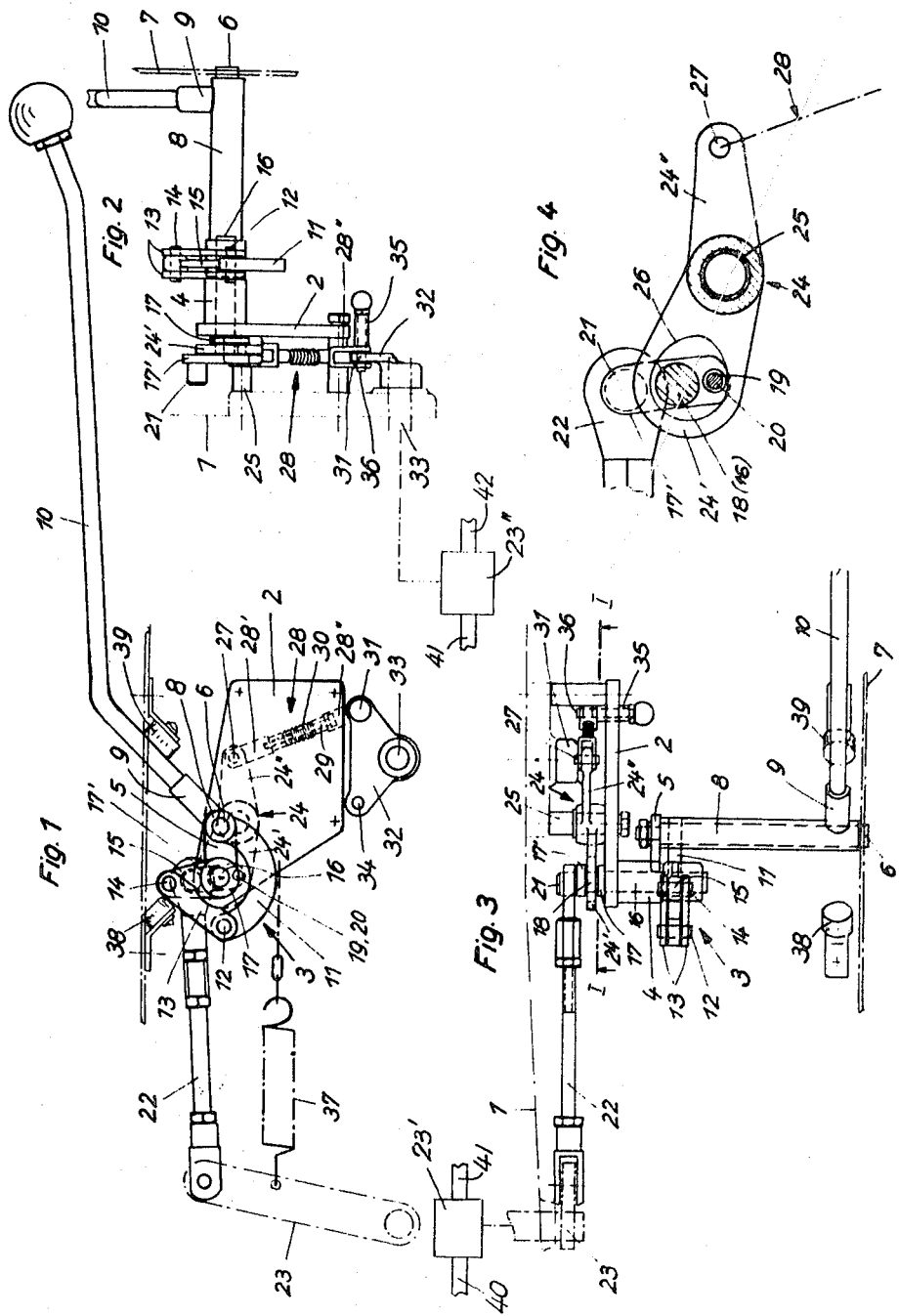

INVENTOR
Richard Six

CLUTCH CONTROLS FOR POWER TAKEOFF SHAFTS OF TRACTOR OR LIKE VEHICLES

This invention relates to clutch controls for power drives with a power takeoff shaft in general, and more particularly for tractor power drives with a power takeoff shaft independently of the drive of the tractor, the drive portion of which is adapted to be connected and disconnected by a clutch and the driven portion by another clutch, respectively.

In known power drives of tractor or like vehicles, the power takeoff shaft is usually driven by a clutch independent of the drive of the tractor, i.e., a power takeoff clutch, and there is provided between the driving and driven sections of the power takeoff shaft another simple clutch, i.e., a jaw clutch, which is not shiftable under load, with both clutches being independently operable. In this construction, there is connected with the driving shaft section an auxiliary drive for the hydraulic pump which is disconnected on disengaging the power takeoff clutch. If the steering mechanism of tractors is power-operated by this pump, the pump drive will inevitably be interrupted in operation of power takeoff shaft operated machinery, especially in making turns which require interruption of the power takeoff shaft drive, which makes steering a difficult task. In order to avoid this, there have been provided for hydraulic power steering a separate hydraulic pump independent of the power drive which, however, entails considerably higher cost. Since this hydraulic pump may also operate the power lifter of these vehicles, for example, further time-consuming work stoppages may ensue when the power takeoff shaft drive for connected machinery must be interrupted and a lift operation is to take place at the same time. In that case, the required mode of operation is: disconnect power takeoff shaft clutch—disconnect jaw clutch—connect power takeoff shaft clutch, only then will the lifter operate. The same sequence of clutch operation must be followed to continue the work process.

Another disadvantage of this construction lies therein that in holding the power takeoff shaft clutch disconnected in making turns, the springs and shifter bearings of the clutch are under high load, moreover, the operator's foot is arrested at pedal operation, which in case of possible trouble requiring quick actuation of the main clutch, could lead to disorder because in changing from one pedal to the other the power takeoff shaft clutch will be reengaged. The disadvantage of a heavy load-subjected clutch on interruption of the auxiliary drive also prevails in a known hand-lever actuation of the power takeoff shaft clutch.

It is an object of the invention to provide clutch controls which do not have these disadvantages, and which permit, at the same clutch arrangements, drive and drive interruption of the power takeoff shaft at only brief interruption of the power takeoff shaft drive and associated auxiliary drive. This is achieved according to the invention by actuating both clutches with one operating lever, whereby in the sequence of clutch actuation the power takeoff shaft clutch is actuated before actuation of the intermediate clutch, and the power takeoff shaft clutch is then actuated again. This secures the advantage that the clutch shift process is rapid, the interruption of the auxiliary drive is only brief and without any adverse performance effect, and the springs and shift bearings of the power takeoff shaft clutch do not appreciably remain under heavy load. If the operating lever is in the form of a hand lever, the operator's foot is also free for actuation of the drive clutch, with the clutch elements being under no load.

The invention lies in a crankshaft, which is actuated by an operating lever, and which, with one crank pin, and through intermediation of a link, is operatively connected with a lever of the power takeoff shaft clutch, and is with a further crank pin, and through intermediation of a thereby actuated shift lever and a link, operatively connected with the intermediate clutch, with this further crank pin being so angularly spaced from the one crank pin that the power takeoff shaft clutch is actuated before and after actuation of the intermediate clutch. According to a further aspect of the invention, the shift lever is provided with a cam with which the further crank pin cooperates. The shift lever is preferably a double-arm lever in one arm of which there is provided an aperture which constitutes, and has the outline of, the aforementioned cam, and the other arm is connected with the link to the jaw clutch.

Since it may happen that in connecting the jaw clutch the teeth thereof may come into front-to-front abutment, it is preferable to provide for lengthwise yieldability of the shift link.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a side view of clutch controls embodying the invention;

FIGS. 2 and 3 are a front view and a plan view, respectively, of the same clutch controls;

FIG. 4 is an enlarged fragmentary section through the controls as taken on the line I—I in FIG. 3.

Figure 5:
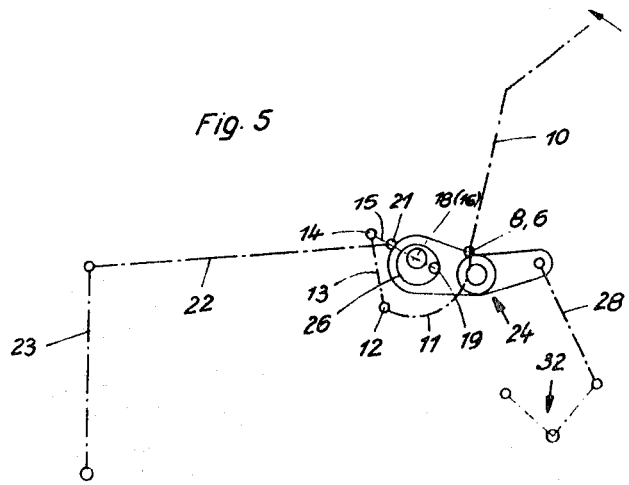
FIGS. 5 to 7 diagrammatically illustrate the clutch controls in different stages of actuation.

Referring to the drawings, and more particularly to FIGS. 1 to 3, there is removably mounted on the rear of the clutch housing 1 of a tractor power drive (not shown in detail) a plate 2 which serves as substantial support for the clutch controls 3. Firmly mounted on the plate 2 is a bearing sleeve 4 with a fixed arm 5. An axle 6 is firmly mounted with one end in the arm 5, and is with its other end supported in a fender of the tractor. Turnable on the axle shaft 6 is a sleeve 8 on which a socket clamp 9 for the operating lever 10 is fixed. With the lever 10 being turnably adjustable in and removable from the socket clamp 9, the same may be positioned in the space between the operator's seat and fender for most convenient side reach by an operator. Rigidly connected with the sleeve 8 is an arm 11 at the free end of which links 13 are pivotally connected at 12. The other ends of these links are at 14 pivotally connected with a lever 15. The lever 15 is rigidly fixed on a crankshaft 16 which is turnable in the bearing sleeve 4. Crank arms 17 and 17' of the crankshaft 16, which are joined by a shaft extension 18, carry an operating roll 19 on another crank arm connection 20. The crankshaft 16 is at a pin 21 on its one crank arm 17' connected through a usually lengthwise adjustable link 22 with the lever 23 for actuation of the power takeoff shaft clutch 23'.

The shift lever 24, for actuation of the intermediate or jaw clutch 23'' is double-armed and turnably mounted on a spacer post 25 which also serves to mount the plate 2. One arm 24' of the shift lever 24 projects between the crank arms 17 and 17', and is provided with a cam aperture 16 with which the control roll 19 cooperates. Pivotally connected at 27 with the other arm 24'' of the shift lever 24 is a lengthwise yielding link 28. To this end, there are provided on a connecting rod 29 between the end connectors 28', 28'' cup springs 30, with one end connector 28'' being displaceable on the connecting rod 29 on encountering resistance to its downward shift.

The other end of the link 28 is at 31 connected with a shift segment 32 which is fast on the shaft 33 of the shifter fork of the intermediate clutch 23'' for actuation of the latter. In modern tractors, the power takeoff shaft can be driven at either of two speeds, wherefore the shift segment 32 is provided with a second bore 34 so that the link 28 may be connected with the shift segment at 31 or 34 depending on the choice of the power takeoff shaft drive speed. There is to this end provided on the link end connector 28'' a sleeve 35 in which a spring-urged pin 36 is retractible.

To avoid play in the clutch controls, there is provided a tension spring 37 between plate 2 and lever 23. There are also fixed to the floorboard of the tractor stops 38, 39 in the form of rubber pads which define the limits of the shift range of the operating lever 10.

The controls operate as follows.

Figure 6:
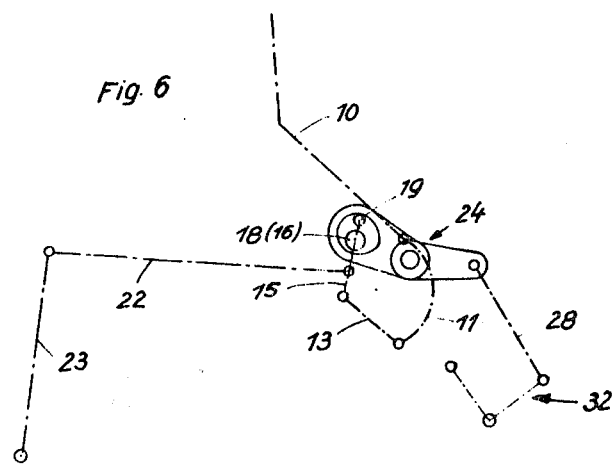
Figure 7:
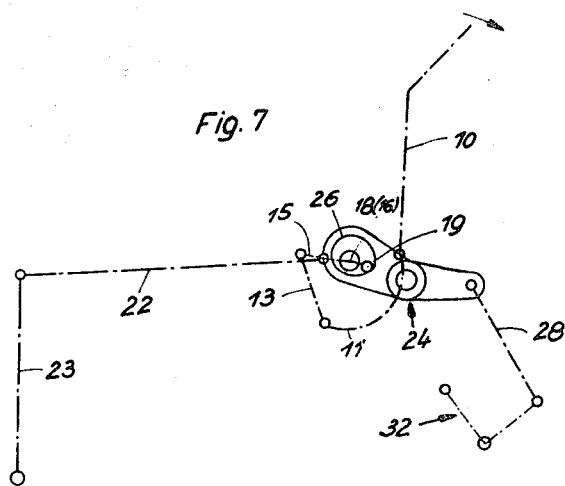

In order to drive the power takeoff shaft, the operating lever 10 is turned anticlockwise from the neutral position in FIG. 1, whereby the connecting parts 11, 13 and 15 take along the crankshaft 16, the operating roll 19 and the crank pin 21 from their neutral position in FIG. 4 in the same direction. On such movement of the parts into the position in FIG. 5, the power takeoff shaft clutch 23' is almost disengaged, whereas the operating roll 19 has as yet no effect on the shift lever 24. In the further motion sequence of the parts to the position in FIG. 6, the power takeoff shaft clutch 23' is first completely disengaged while the operating roll 19 acts simultaneously on the cam aperture 26 to shift the shift lever 24 clockwise and thereby cause engagement of the intermediate or jaw clutch 23'', whereby in the last phase of this operation the power takeoff shaft clutch 23' is reengaged because the crank pin 21 has since passed beyond dead center position and takes along the lever 23 in clockwise direction. The power takeoff shaft is thus engaged and the operating lever 10 rests against the stop 38.

For interrupting the drive of the power takeoff shaft, the operating lever 10 is shifted clockwise, whereby on the ensuing motion of the parts there takes place the sequence—disconnection of the power takeoff shaft clutch—disconnection of the jaw clutch—reengagement of the power takeoff shaft clutch—in smoother interflow fashion.

As shown in FIG. 1, the power takeoff shaft clutch 23' connects a power drive 40 of the tractor or like vehicle with the driving section 41 of the power takeoff shaft, while the jaw clutch 23'' connects the driving section 41 of the power takeoff shaft with the driven section 42 thereof.

What is claimed is:

1. In combination with a power drive of a tractor or like vehicle, and a power takeoff shaft with driving and driven sections, and first and second clutches between said power drive and driving shaft section and between said driving and driven shaft sections, respectively, for the drive of said shaft sections, with said first and second clutches having first and second shift levers, respectively, for clutch connection and disconnection, clutch controls comprising a turnable crankshaft with first and second crank pins; a turnable operating lever operatively connected with said crankshaft; a first operating connection between said first crank pin and first shift lever; and a second operating connection between said second crank pin and second shift lever, with said crank pins being so angularly displaced from each other that on actuating said operating lever in opposite directions said second clutch is engaged and disengaged, respectively, and said first clutch is disengaged prior to, and also engaged after, each engagement and each disengagement of said second clutch.

2. The combination in claim 1, in which said second operating connection includes a pivoted shift lever with a cam with which said second crank pin cooperates.

3. The combination in claim 2, in which said shift lever is double-armed, in one arm of which there is an aperture which forms said cam, and said second operating connection further includes a link pivotally connected at one end with the other arm of said shift lever.

4. The combination in claim 3, in which said crankshaft has spaced crank arms which carry said second crank pin, and said shift lever extends with its cam aperture between said crank arms.

5. The combination in claim 4, in which said crank arms are connected by a coaxial extension of said crankshaft, with said shaft extension passing through said cam aperture in said shift lever.

6. The combination in claim 1, in which there is between said operating lever and crankshaft an operating connection including an arm turning with said operating lever.

7. The combination in claim 6, which further provides a fixed post, a sleeve received and turnable on said post and having a socket removably receiving said operating lever with a clamp force for turning adjustability of the latter, and said arm is carried by said sleeve.

* * * * *